United States Patent
Jung et al.

(10) Patent No.: US 9,590,224 B2
(45) Date of Patent: Mar. 7, 2017

(54) SECONDARY BATTERY AND MANUFACTURING METHOD THEREOF

(71) Applicant: LG Chem, Ltd., Seoul (KR)

(72) Inventors: Ho-Sub Jung, Daejeon (KR); Seung-Hun Jung, Daejeon (KR); In-Sun Yoo, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/508,149

(22) Filed: Oct. 7, 2014

(65) Prior Publication Data

US 2015/0024255 A1  Jan. 22, 2015

Related U.S. Application Data

(63) Continuation of application No. PCT/KR2014/002014, filed on Mar. 11, 2014.

(30) Foreign Application Priority Data

Mar. 11, 2013  (KR) ........................ 10-2013-0025690
Mar. 11, 2014  (KR) ........................ 10-2014-0028309

(51) Int. Cl.
*H01M 2/26* (2006.01)
*H01M 2/28* (2006.01)
*H01M 2/08* (2006.01)
*H01M 2/02* (2006.01)
*H01M 6/12* (2006.01)
*H01M 6/46* (2006.01)
(Continued)

(52) U.S. Cl.
CPC ............. *H01M 2/30* (2013.01); *H01M 2/024* (2013.01); *H01M 2/206* (2013.01); *H01M 2/266* (2013.01); *Y10T 29/49108* (2015.01)

(58) Field of Classification Search
CPC ......... H04M 2/027; H04M 2/021; H04M 2/06
USPC ............... 429/178, 179, 180, 161, 162, 181
See application file for complete search history.

(56) References Cited

U.S. PATENT DOCUMENTS 6,387,567 B1    5/2002  Noh
6,743,546 B1 *  6/2004  Kaneda ................. H01M 2/021
                                                429/127
2004/0038122 A1  2/2004  Hisamitsu et al.
(Continued)

FOREIGN PATENT DOCUMENTS

EP    2363907 A1     9/2011
JP    2004-087260 A  3/2004
(Continued)

OTHER PUBLICATIONS

International Search Report for PCT/KR2014/002014 dated Jul. 3, 2014.
Written Opinion for PCT/KR2014/002014 mailed on Jul. 3, 2014.

*Primary Examiner* — Patrick Ryan
*Assistant Examiner* — Julian Anthony
(74) *Attorney, Agent, or Firm* — Lerner, David, Littenberg, Krumholz & Mentlik, LLP

(57) ABSTRACT

The present disclosure discloses a secondary battery and a manufacturing method thereof. According to the present disclosure, the influence of heat generated at a welding spot between an electrode tab and an electrode lead on the performance of a secondary battery may be minimized. Accordingly, in the design of a large capacity secondary battery, the battery performance may be close to an ideal condition.

10 Claims, 14 Drawing Sheets

(51) Int. Cl.
*H01M 2/30* (2006.01)
*H01M 2/20* (2006.01)

(56) References Cited

U.S. PATENT DOCUMENTS

| | | |
|---|---|---|
| 2009/0317717 A1 | 12/2009 | Ryu et al. |
| 2013/0011717 A1 | 1/2013 | Yotsumoto |
| 2013/0045402 A1 | 2/2013 | Takahashi |

FOREIGN PATENT DOCUMENTS

| | | |
|---|---|---|
| JP | 2006324093 | 11/2006 |
| JP | 2007-184184 A | 7/2007 |
| JP | 2007-280679 A | 10/2007 |
| JP | 2008-60407 A | 3/2008 |
| JP | 2011204552 A | 10/2011 |
| JP | 2011233385 A | 11/2011 |
| JP | 2012155957 A | 8/2012 |
| KR | 2008-0009353 A | 1/2008 |

\* cited by examiner

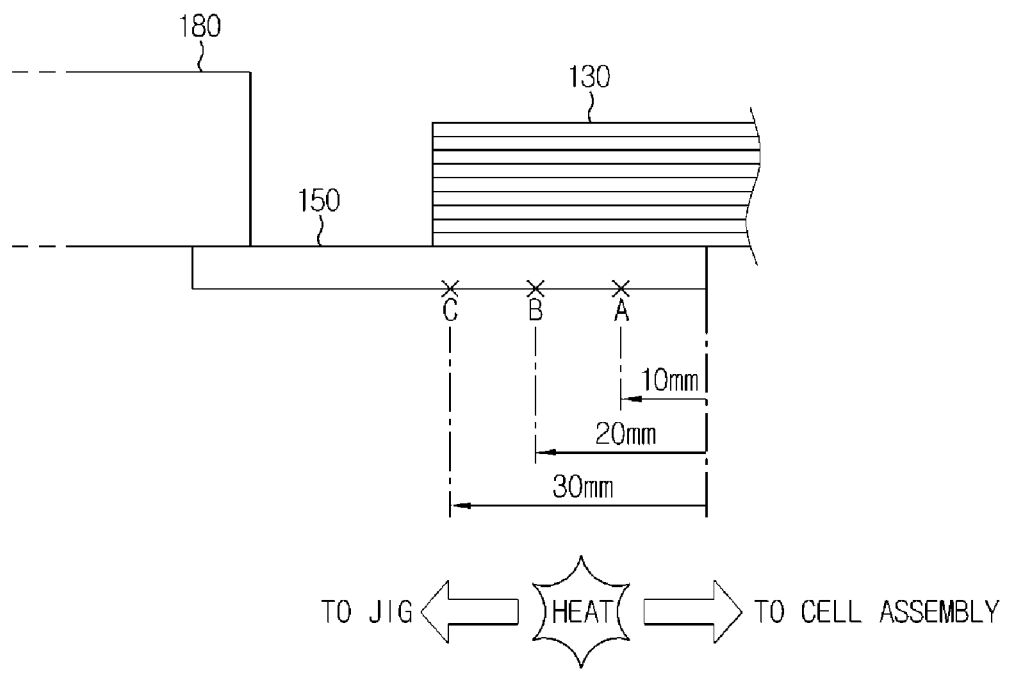

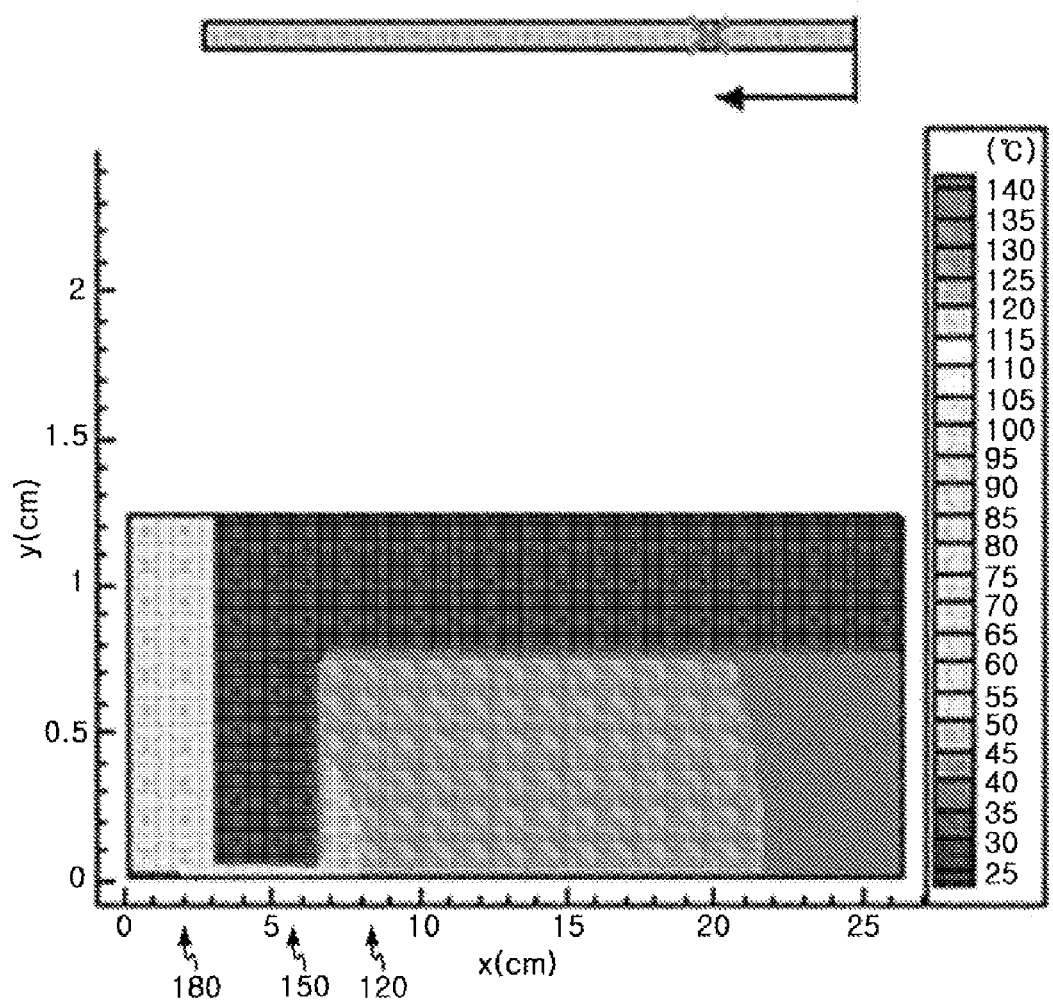

SECONDARY BATTERY AND MANUFACTURING METHOD THEREOF

CROSS-REFERENCE TO RELATED APPLICATION

The present application is a continuation of International Application No. PCT/KR2014/002014 filed on Mar. 11, 2014, which claims priority to Korean Patent Application No. 10-2013-0025690 filed in the Republic of Korea on Mar. 11, 2013 and Korean Patent Application No. 10-2014-0028309 filed in the Republic of Korea on Mar. 11, 2014, the disclosures of which are incorporated herein by reference.

TECHNICAL FIELD

The present disclosure relates to a secondary battery and a manufacturing method thereof, and more particularly, to a secondary battery on which the influence of heat generated at a welding spot between an electrode tab and an electrode lead is minimized and a manufacturing method thereof.

BACKGROUND ART

Due to its characteristics of being easily applicable to various products and electrical characteristics such as a high energy density, a secondary battery is not only commonly applied to portable equipment, but universally applied to an electric vehicle (EV) or a hybrid electric vehicle (HEV) propelled by an electric driving source. This secondary battery is gaining attention for its primary advantages of remarkably reducing the use of fossil fuels and not generating by-products from the use of energy, making it a new eco-friendly and energy efficient source of energy.

Recently, with the growing interests in smart grid, a high capacity energy storage system that stores excess energy is required to build an intelligent electrical grid. To build a high capacity energy storage system, a plurality of secondary batteries are connected in series or parallel for required output and charging capacity designs.

As the output and charging capacity required for an energy storage system becomes higher, a number of secondary batteries increases. Also, as the output and charging capacity required for an energy storage system becomes higher, the size of secondary batteries also increases. In this instance, a secondary battery generates heat during charging and discharging, and in the case of a high capacity energy storage system, even a small amount of heat generation may have great influence on an entire energy storage system.

Accordingly, studies are being actively made to minimize the influence of heat generated from secondary batteries constituting an energy storage system.

DISCLOSURE

Technical Problem

The present disclosure is designed to solve the problem of the related art, and therefore, the present disclosure is directed to providing a secondary battery which is less subject to the influence of heat generated at a welding spot between an electrode tab and an electrode lead and a manufacturing method thereof.

Technical Solution

To achieve the above object, a secondary battery according to the present disclosure includes a cell assembly having a stack of at least two unit cells, each unit cell including a cathode plate, a separator, and an anode plate, a cathode tab and an anode tab (hereinafter referred to as 'an electrode tab') provided protrusively from the cathode plate and the anode plate for each unit cell, a cathode lead and an anode lead (hereinafter referred to as 'an electrode lead') electrically connected to a plurality of cathode tabs and a plurality of anode tabs, a welding part which mechanically connects the electrode tab to the electrode lead, and a case which seals the cell assembly such that a part of the electrode lead is exposed to outside, wherein the welding part is formed near the cell assembly.

According to an exemplary embodiment of the present disclosure, the welding part may be formed near the cell assembly along a lengthwise direction of the electrode lead with respect to a center point of a surface where the electrode tab is each in contact with the electrode lead.

According to another exemplary embodiment of the present disclosure, the welding part may be formed within a ⅓ area closer to the cell assembly among a lengthwise direction of the electrode lead on a surface where the electrode tab is each in contact with the electrode lead.

According to another exemplary embodiment of the present disclosure, the welding part may be formed within a range of 10 mm from one end of the electrode lead disposed within the case.

According to an exemplary embodiment of the present disclosure, the welding part may be formed by resistance welding, ultrasonic welding, laser welding, or a conductive adhesive. In this instance, the welding part may be formed in a shape of a point or a line, or in geometry. Also, the welding part may be formed in multiple numbers.

To achieve the above object, a method for manufacturing a secondary battery according to the present disclosure includes (a) preparing a cell assembly in which at least two unit cells including a cathode plate, a separator, and an anode plate are stacked, and for each unit cell, a plurality of cathode tabs and a plurality of anode tabs are protrusively provided from the cathode plate and the anode plate, respectively, (b) forming a welding part at a region near the cell assembly on each surface where the cathode tab is in contact with the cathode lead and the anode tab is in contact with the anode lead, to mechanically connect the cathode tab to the cathode lead and the anode tab to the anode lead, and (c) loading the cell assembly in between the case such that parts of the cathode lead and the anode lead are exposed to outside, and sealing the case.

According to an exemplary embodiment of the present disclosure, the step (b) may include forming the welding part near the cell assembly along a lengthwise direction of the electrode lead with respect to a center point of the surface where the electrode tab is each in contact with the electrode lead.

According to another exemplary embodiment of the present disclosure, the step (b) may include forming the welding part within a ⅓ area closer to the cell assembly among a lengthwise direction of the electrode lead on the surface where the electrode tab is each in contact with the electrode lead.

According to another exemplary embodiment of the present disclosure, the step (b) may include forming the welding part within a range of 10 mm from one end of the electrode lead disposed within the case.

According to an exemplary embodiment of the present disclosure, the step (b) may include forming the welding part by resistance welding, ultrasonic welding, laser welding, or a conductive adhesive. In this instance, the step (b) may include forming the welding part in a shape of a point or a line, or in geometry. Also, the step (b) may include forming a plurality of welding parts.

Advantageous Effects

According to the present disclosure, the influence of heat generated at a welding spot between an electrode tab and an electrode lead on the performance of a secondary battery may be minimized. Accordingly, in the design of a large capacity secondary battery, the battery performance may be close to an ideal condition.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

FIG. 4 is a conceptual diagram schematically illustrating a change based on a welding spot location.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
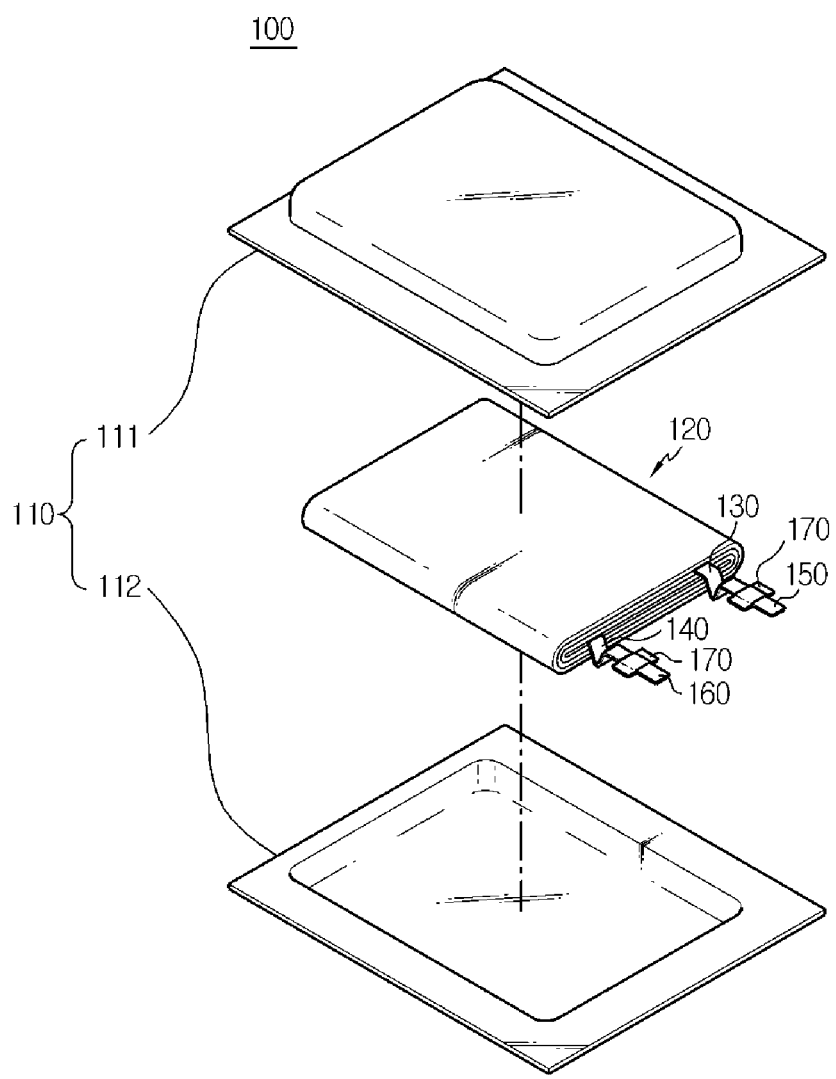
FIG. 1 is an exploded perspective view illustrating construction of a secondary battery according to an exemplary embodiment of the present disclosure.

FIG. 1 is an exploded perspective view illustrating construction of a secondary battery 100 according to an exemplary embodiment of the present disclosure.

Referring to FIG. 1, a type of secondary battery, a pouch-type secondary battery, is illustrated. Based on a case shape, a secondary battery may be classified into a can-shaped secondary battery, a prismatic secondary battery, and a pouch-type secondary battery. Among them, a pouch-type secondary battery is widely used due to being easy to manufacture. Accordingly, in the description of the secondary battery according to the present disclosure, description is provided based on a pouch-type secondary battery. However, the scope of protection of the present disclosure is not limited by the case shape.

The secondary battery 100 according to the present disclosure includes a case 110, a cell assembly 120, a cathode tab 130, an anode tab 140, a cathode lead 150, and an anode lead 160.

The cell assembly 120 includes a stack of at least two unit cells, each unit cell including a cathode plate, a separator, and an anode plate. Also, for each unit cell, a cathode tab 130 and an anode tab 140 are protrusively provided from the cathode plate and the anode plate, respectively.

As a material for the cathode plate, aluminum is mainly used. Alternatively, the cathode plate may be made of stainless steel, nickel, titanium, baked carbon, aluminum, or stainless steel treated with carbon, nickel, titanium, and silver on the surface thereof. Further, any material may be used for the cathode plate if it does not cause a chemical change of the secondary battery and has high conductivity.

The cathode tab 130 is provided at a certain area of the cathode plate, and may be formed in the shape of extending from the cathode plate. Alternatively, the cathode tab 130 may be formed by joining a member of a conductive material to a certain area of the cathode plate, for example, through welding. Also, the cathode tab 130 may be formed by coating and drying a cathode material on a certain area of the periphery of the cathode plate.

As a material for the anode plate corresponding to the cathode plate, copper is mainly used. Alternatively, the anode plate may be made of stainless steel, aluminum, nickel, titanium, baked carbon, copper, or stainless steel treated with carbon, nickel, titanium, and silver on the surface thereof, and an aluminum-cadmium alloy may be used.

The anode tab 140 is also provided at a certain area of the anode plate, and similar to the cathode tab 130 described in the foregoing, the anode tab 140 may be implemented in the shape of extending from the anode plate, and may be joined by a method which welds a member of a conductive material to a certain area of the anode plate, and the anode tab 140 may be formed by coating and drying an anode material on a certain area of the periphery of the anode plate.

The cathode lead 150 is electrically connected to the cathode tab 130 provided on the cathode plate, and the anode lead 160 is electrically connected to the anode tab 140 provided on the anode plate. Preferably, the cathode lead 150 and the anode lead 160 are joined to a plurality of cathode tabs 130 and a plurality of anode tabs 140, respectively.

To improve adhesion between the case 110 and the cathode lead 150 and the anode lead 160, each of the cathode lead 150 and the anode lead 160 is preferably provided with an insulating tape 170. The insulating tape 170 is not limited to a specific type of material as long as it is insulative and improves adhesion between the cathode lead 150 and the anode lead 160 and the case 110.

As an example, the insulating tape 170 may be made of polyethylene, polyacetylene, PTFE, nylon, polyimide, polyethylene terephthalate, polypropylene, or combinations thereof.

The cathode plate and the anode plate are coated with a cathode active material and an anode active material, respectively. As an example, the cathode active material is a lithium-based active material, and as a typical example, metal oxide may be used such as $LiCoO_2$, $LiNiO_2$, $LiMnO_2$, $LiMn_2O_4$, $LiFePO_4$ or $Li_1+zNi_{1-x-y}Co_xM_yO_2$($0 \leq x \leq 1$, $0 \leq y \leq 1$, $0 \leq x+y \leq 1$, $0 \leq Z \leq 1$, M represents a metal such as Al, Sr, Mg, La, and Mn). The anode active material is a carbon-based active material, and as the anode active material, a carbon material such as crystalline carbon, amorphous carbon, a carbon composite and a carbon fiber, a lithium metal, and a lithium alloy may be used. Types and chemical compositions of the cathode active material and the anode active material may vary depending on a type of secondary battery, and it should be understood that the above specific examples are just illustrative.

The separator is not limited to a specific type as long as it is made of a porous material. The separator a porous polymer membrane, for example, a porous polyolefin membrane, polyvinylidene fluoride-co-hexafluoropropylene, polyvinylidene fluoride-trichloroethylene, polymethylmetacrylate, polyacrylonitrile, polyvinylpyrrolidone, polyvinylacetate, ethylene vinyl acetate copolymer, polyethyleneoxide, cellulose acetate, cellulose acetate butylate, cellulose acetate propionate, cyanoethylpullulan, cyanoethylpolyvinylalcohol, cyanoethylcellulose, cyanoethylsucrose, pullulan, carboxyl methyl cellulose, acrylonitrile butadiene styrene copolymer, polyimide, polyethylene terephthalate, polybutylene terephthalate, polyester, polyacetal, polyamide, polyetheretherketone, polyethersulfone, polyphenylene oxide, polyphenylene sulfidro, polyethylene naphthalene, a non-woven membrane, a membrane having a porous web structure, or combinations thereof. Inorganic particles may be bound to one surface or both surfaces of the separator.

The inorganic particles are preferably inorganic particles having a high dielectric constant greater than or equal to 5, and more preferably, inorganic particles having a high dielectric constant greater than or equal to 10 and a low density. This facilitates the transfer of lithium ions moving in the battery. Non-limiting examples of inorganic particles having a high dielectric constant greater than or equal to 5 include $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$(PMN-PT), $BaTiO_3$, hafnia ($HfO_2$), $SrTiO_3$, $TiO_2$, $Al_2O_3$, $ZrO_2$, $SnO_2$, $CeO_2$, $MgO$, $CaO$, $ZnO$, $Y_2O_3$, or mixtures thereof.

The cell assembly 120 may have a simple stack structure of a plurality of unit cells with an insulating membrane interposed between the unit cells. As another example, the cell assembly 120 may have a stack folding structure in which unit cells are arranged at a proper interval on an upper surface and/or a lower surface of an insulating membrane and the insulating membrane is folded in one direction together with the unit cells, so the unit cells are inserted between the folded insulating membrane. As another example, the cell assembly 120 may have a jelly roll structure formed by mounting, on an insulating membrane, a unit cell extending in the shape of a strand and continuously rolling up the unit cell and the insulating membrane together in one direction. The insulating membrane may be made of a material that may be employed as the separator. According to circumstances, the insulating membrane may be made of the same material membrane and/or with the same structure as the separator.

The case 110 includes a top pouch film 111 and a bottom pouch film 112. The bottom pouch film 112 has a groove corresponding to the shape of the bottom of the cell assembly 120 to mount the bottom of the cell assembly 120. Also, the top pouch film 111 has a groove corresponding to the shape of the top of the cell assembly 120 to mount the top of the cell assembly 120. According to circumstances, the groove may be omitted. Although the pouch case 110 divided into the top pouch film 111 and the bottom pouch film 112 is used in this embodiment, various types of pouch cases may be used. As an example, a pouch case having a structure in which a top pouch film and a bottom pouch film are joined at one corner may be used.

The pouch film has a structure in which an upper surface and a lower surface of a metal foil are laminated by an insulating polymer. The metal foil prevents the outside moisture and gas from permeating the cell assembly 120 and keeps chemical substances poured into the pouch case 110 from leaking out while improving the mechanical strength of the pouch case 110. As the metal foil, at least one selected among alloys of iron, carbon, chrome, and manganese, alloys of iron, chrome, and nickel, aluminum, and equivalents thereto may be used, but the present disclosure is not limited thereto. When the metal foil is made of a material containing iron, the mechanical strength increases, and when the metal foil is made of a material containing aluminum, flexibility is improved. Typically, an aluminum metal foil is preferably used.

Figure 2:
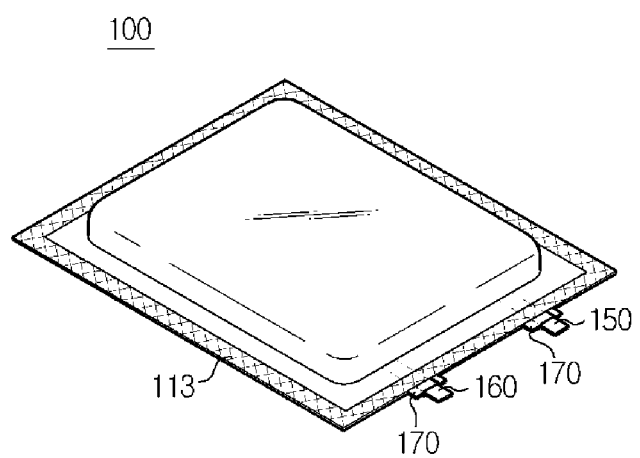
FIG. 2 is a perspective view illustrating a secondary battery according to an exemplary embodiment of the present disclosure.

FIG. 2 is a perspective view illustrating the secondary battery 100 according to an exemplary embodiment of the present disclosure.

Referring to FIG. 2, the peripheral areas of the top pouch film 111 and the bottom pouch film 112 are welded by heat. In this instance, a line formed by the heat welding is referred to as a heat welding line 113. Meanwhile, parts of the cathode lead 150 and the anode lead 160 are exposed to the outside of the case. Charging and discharging is performed by an electrical connection to the outside through the cathode lead 150 and the anode lead 160 exposed to the outside.

Figure 3:
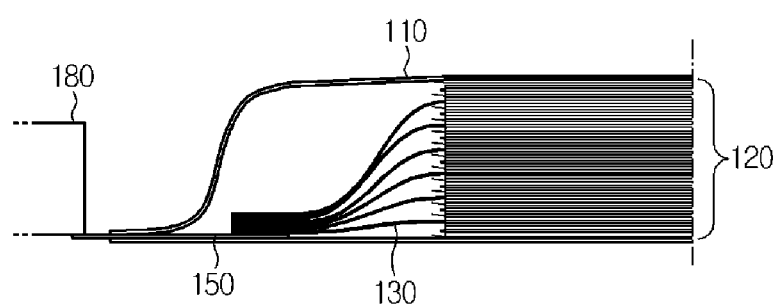
FIG. 3 is a partially enlarged cross-sectional view illustrating a secondary battery according to an exemplary embodiment of the present disclosure, when viewed from the side.

FIG. 3 is a partially enlarged cross-sectional view illustrating the secondary battery 100 according to an exemplary embodiment of the present disclosure, when viewed from the side.

Referring to FIG. 3, the cathode lead 150 exposed to the outside of the case 110 is connected to a jig 180. Although the embodiment of FIG. 3 shows focusing on the cathode lead 150, the anode lad 160 also has the same structure. Accordingly, it should be understood that the following description will be provided focusing on the cathode tab 130 and the cathode lead 150, but the same may be applied to the anode tab 140 and the anode lead 160.

The jig as used herein is referred to as an element for forming an electrical connection of the secondary battery 100 according to the present disclosure to an external device or adjacent another secondary battery. The jig 180 attached to each of the cathode lead 150 and the anode lead 160 may be formed from different materials. As an example, the jig 180 attached to the cathode lead 150 may be made of the same material as the cathode lead 150, that is, aluminum, and the jig 180 attached to the anode lead 160 may be made of the same material as the anode lead 160, that is, copper or copper coated with nickel. However, as the material of the jig 180, any conductive material may be used. Also, the jig 180 may have various sizes and shapes, and the present disclosure is not limited by the size, shape, and material type of the jig 180.

The cathode tab 130 and the cathode lead 150 are not only electrically but also mechanically connected to prevent separation or deviation caused by the external impact. In this instance, a welding part serves to mechanically connect the cathode tab 130 and the cathode lead 150.

According to an exemplary embodiment of the present disclosure, the welding part is formed by resistance welding, ultrasonic welding, laser welding, or a conductive adhesive. In this instance, the welding part may be variously formed in the shape of a point or a line, or in geometry. Also, a plurality of welding parts may be formed.

FIG. 4 is a conceptual diagram schematically illustrating a change based on a welding spot location.

Referring to FIG. 4, welding parts are formed at different three spots over a region where the cathode tab 130 and the cathode lead 150 are in contact with each other. In this example, assume that the welding part is formed by ultrasonic welding.

First, given that 'A' is formed at a location 10 mm away from one end of the cathode lead 150 disposed within the case 110, 'B' at a location 20 mm away, and 'C' at a location 30 mm away. When the secondary battery 100 is charged or discharged, an electric current flows through the cathode tab 130 and the cathode lead 150. In this instance, a contact resistance exists in the welding part. Thus, a heat generation phenomenon occurs from the welding part.

If convection cooling by the ambient air is feeble, heat generated from the welding part is transferred to the jig 180 or the cell assembly 120 through a conduction phenomenon. In this instance, an amount of heat transferred to the jig 180 and the cell assembly 120 changes based on the locations of the different three spots A, B, and C. When the welding part is formed at the spot A closest to the cell assembly 120, an amount of heat transferred to the cell assembly 120 will be larger than an amount of heat transferred to the jig 180. In contrast, when the welding part is formed at the spot C closest to the jig 180, an amount of heat transferred to the jig 180 will be larger than an amount of heat transferred to the cell assembly 120. Also, when the welding part is formed at the intermediate spot B, an amount of transferred heat will be at an intermediate level between A and C.

Generally, when a material is heated and its temperature increases, the material has a property that an internal resistance increases. Accordingly, if heat generation from a welding part during charging and discharging of a secondary battery is an inevitable phenomenon, the inventors carried out an experiment to find a location where performance of a secondary battery is least affected by heat.

FIGS. 5a through 7c are heat distribution diagrams illustrating an extent of heat generation based on a welding spot location.

Referring to FIGS. 5a through 7c, when welding parts are formed at different spots, an extent of temperature increase of the jig 180 and the cell assembly 120 can be identified by color. Also, in this experiment, each secondary battery was discharged at 25° C. and at a rate of 2C.

The following Table 1 summarizes the specification of secondary batteries used in each experiment.

TABLE 1

| Classification | Number of unit cells | Charging capacity | Cell length | Cell width | Cell thickness | Lead-tab thickness |
|---|---|---|---|---|---|---|
| FIG. 5 | 11 | 15 Ah | 20.0 cm | 14.5 cm | 5.5 mm | 0.2 mm |
| FIG. 6 | 22 | 30 Ah | 20.0 cm | 14.5 cm | 11.0 mm | 0.3 mm |
| FIG. 7 | 33 | 45 Ah | 20.0 cm | 14.5 cm | 15.5 mm | 0.4 mm |

Referring to FIGS. 5a through 7c together, it can be seen that when the location of the welding part goes from A to C, that is, as the location of the welding part becomes closer to the jig 180, the temperature of the jig 180 increases, and on the contrary, the temperature of the cell assembly 120 decreases. However, it can be seen that when the location of the welding part goes from A to C, an extent of temperature decrease of the cell assembly 120 is low, compared to an extent of temperature increase of the jig 180.

In other words, when the location of the welding part goes from A to C, the temperature of the jig 180 increases, and when the location of the welding part goes from C to A, the temperature of the cell assembly 120 increases. However, it can be seen that an extent of temperature increase of the cell assembly 120 when the location of the welding part goes from C to A is not great, compared to an extent of temperature increase of the jig 180 when the location of the welding part goes from A to C. Also, it can be seen that the higher charging capacity of the secondary battery, the greater influence on a temperature change of the jig 180 than the cell assembly 120.

Figure 5A:
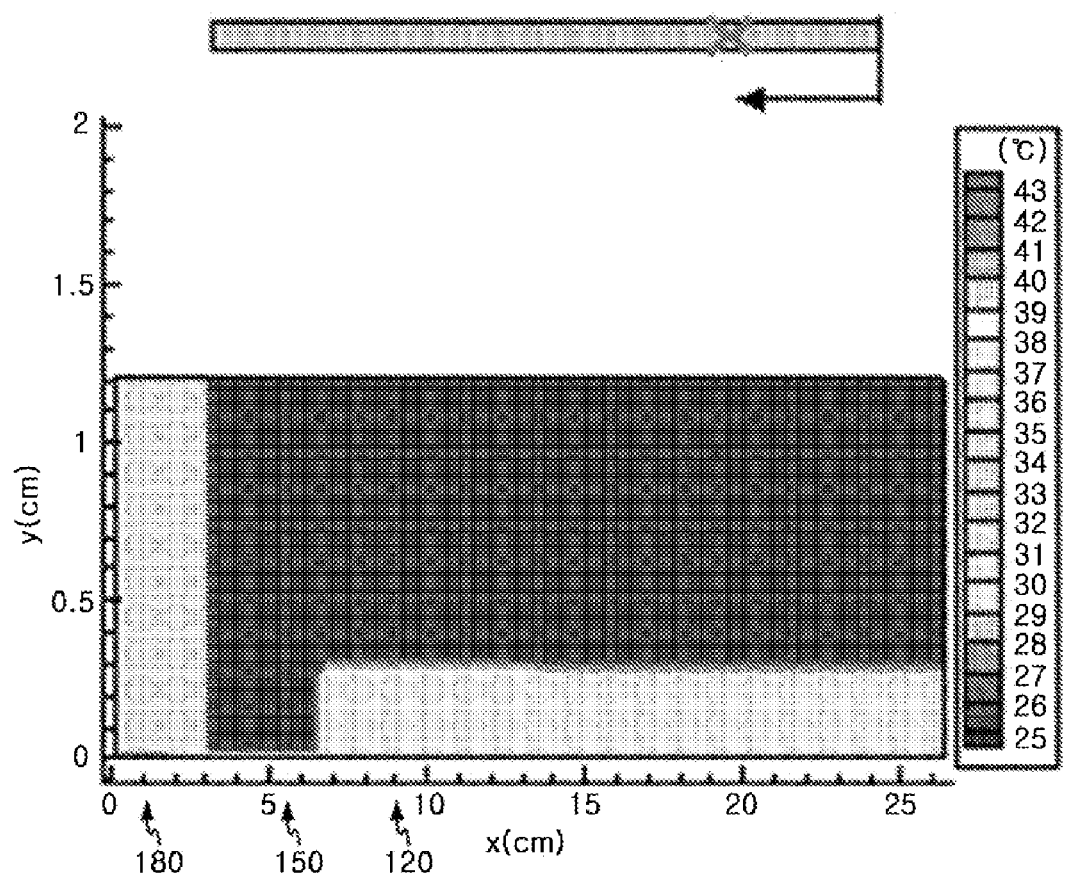
FIGS. 5a through 7c are heat distribution diagrams illustrating an extent of heat generation based on a welding spot location.
Figure 5B:
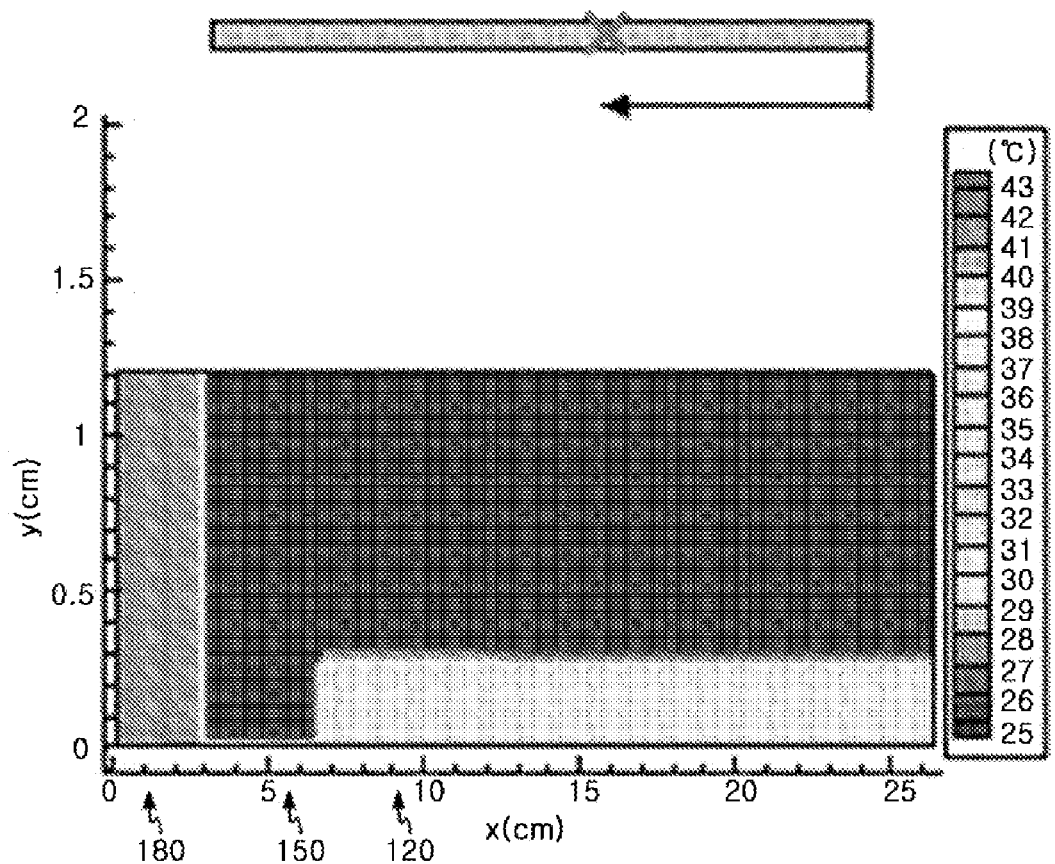
Figure 5C:
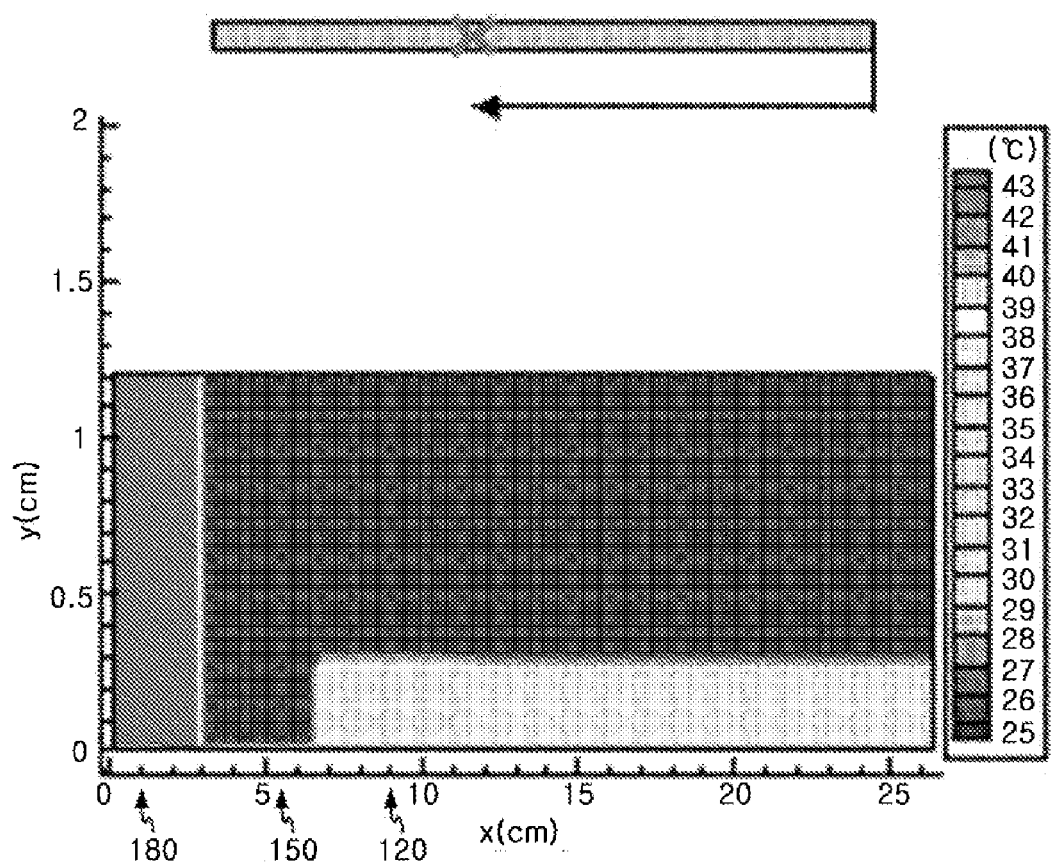

More specifically, referring to FIGS. 5a through 5c, first, when the location of the welding part is formed at the spot A, that is, in FIG. 5a, the jig 180 is tinged with yellow. Accordingly, when the location of the welding part is formed at the spot A, the temperature of the jig 180 is about 40° C. Next, when the location of the welding part is formed at the spot B, that is, in FIG. 5b, the jig 180 is tinged with orange. Accordingly, when the location of the welding part is formed at the spot B, the temperature of the jig 180 is about 42° C. Next, when the location of the welding part is formed at the spot C, that is, in FIG. 5c, the jig 180 is tinged with red. Accordingly, when the location of the welding part is formed at the spot C, the temperature of the jig 180 is about 43° C. That is, it can be seen that when the location of the welding part goes from A to C, the temperature of the jig 180 increases.

Referring to FIGS. 5a through 5c again, first, when the location of the welding part is formed at the spot A, that is, in FIG. 5a, the cell assembly 120 is generally tinged with blue. Accordingly, when the location of the welding part is formed at the spot A, the temperature of the cell assembly 120 is in a range of about 20° C. to 21° C. Next, when the location of the welding part is formed at the spot B, that is, in FIG. 5b, the cell assembly 120 is generally tinged with blue, and likewise, when the location of the welding part is formed at the spot C (see FIG. 5c), the cell assembly 120 is also generally tinged with blue. That is, it can be seen that the cell assembly 120 is relatively less affected by the location of the welding part than the jig 180.

It can be seen that so do FIGS. 6a through 7c.

Figure 6A:
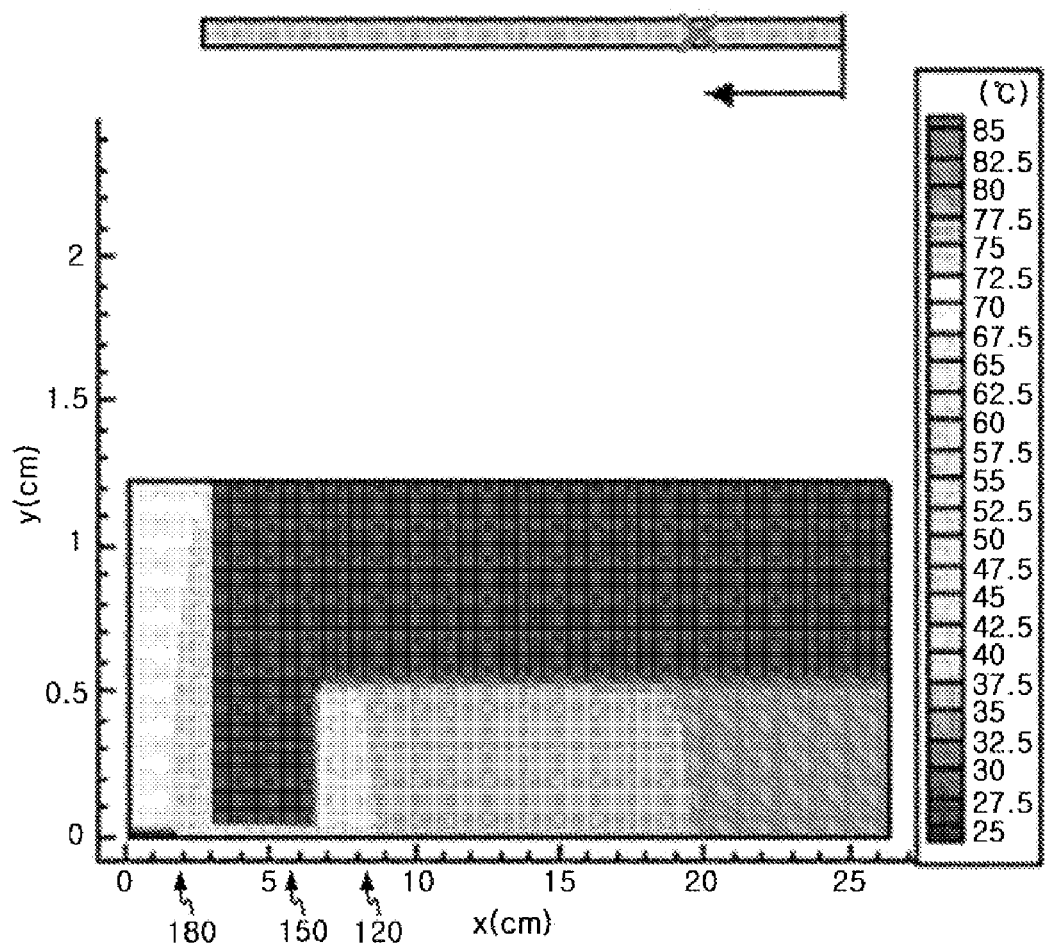
Figure 6B:
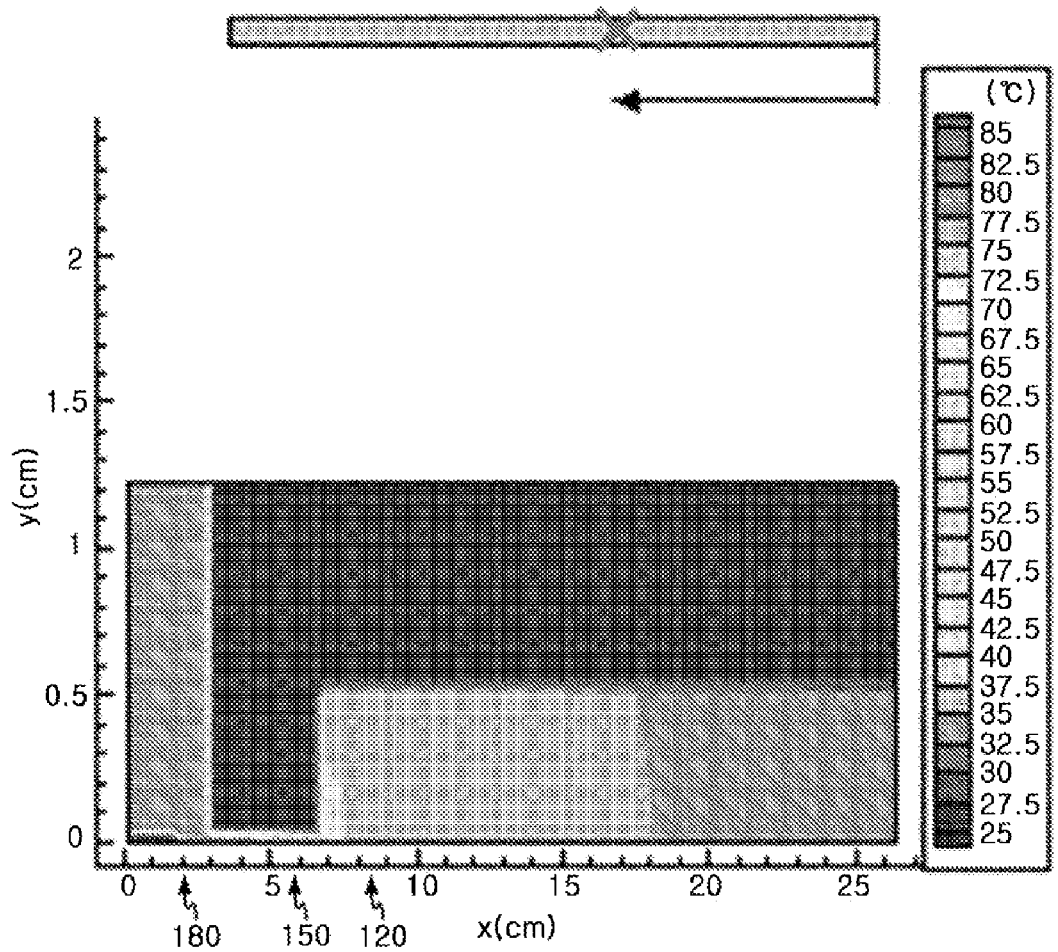
Figure 6C:
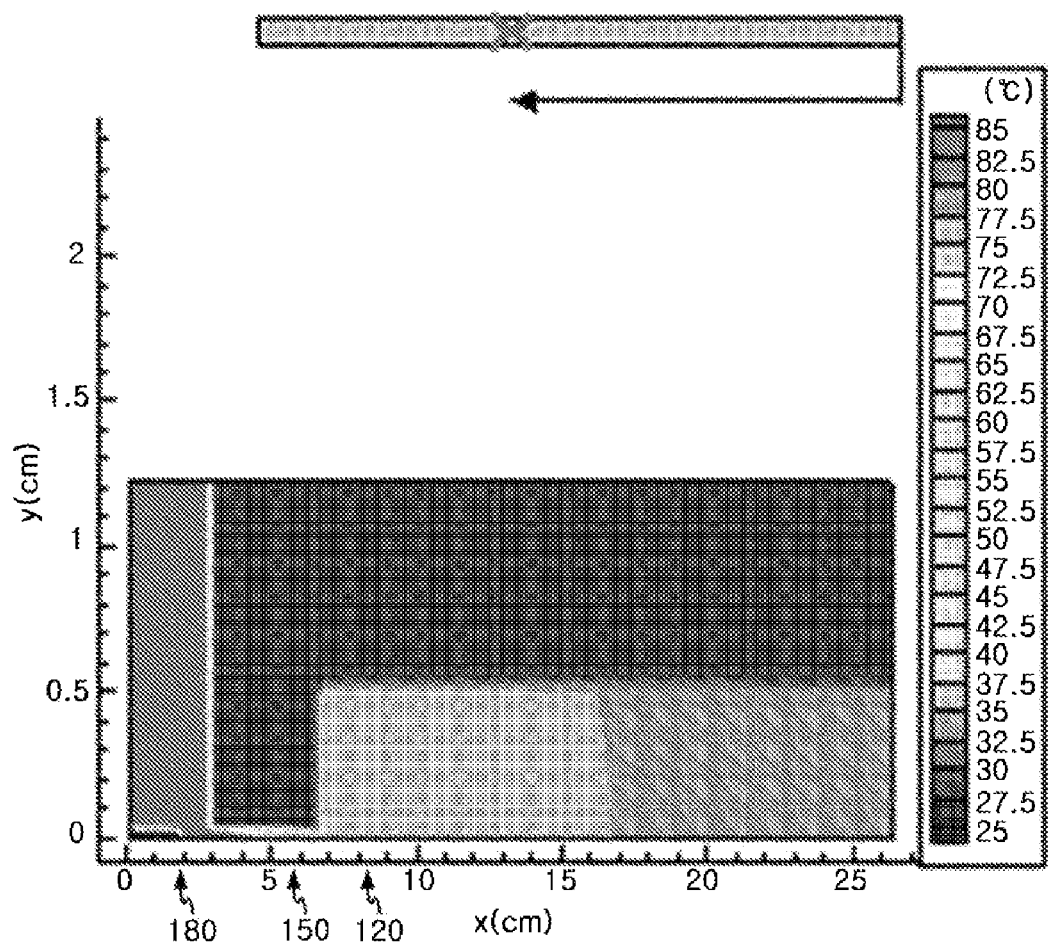

Referring to FIGS. 6a through 6c, in FIG. 6a, the jig 180 is tinged with yellow, and accordingly, the temperature of the jig 180 is about 72.5° C. Also, in FIG. 6b, the jig 180 is tinged with orange. Accordingly, the temperature of the jig 180 is about 80° C. Also, in FIG. 6c, the jig 180 is tinged with red, and accordingly, the temperature of the jig 180 is about 85° C. However, in FIGS. 6a through 6c, the cell assembly 120 does not show a significant temperature difference though the temperature difference is more or less based on the location of the welding part. In the example of FIGS. 6a through 6c, the temperature of the cell assembly 120 is about 40° C.

Figure 7B:
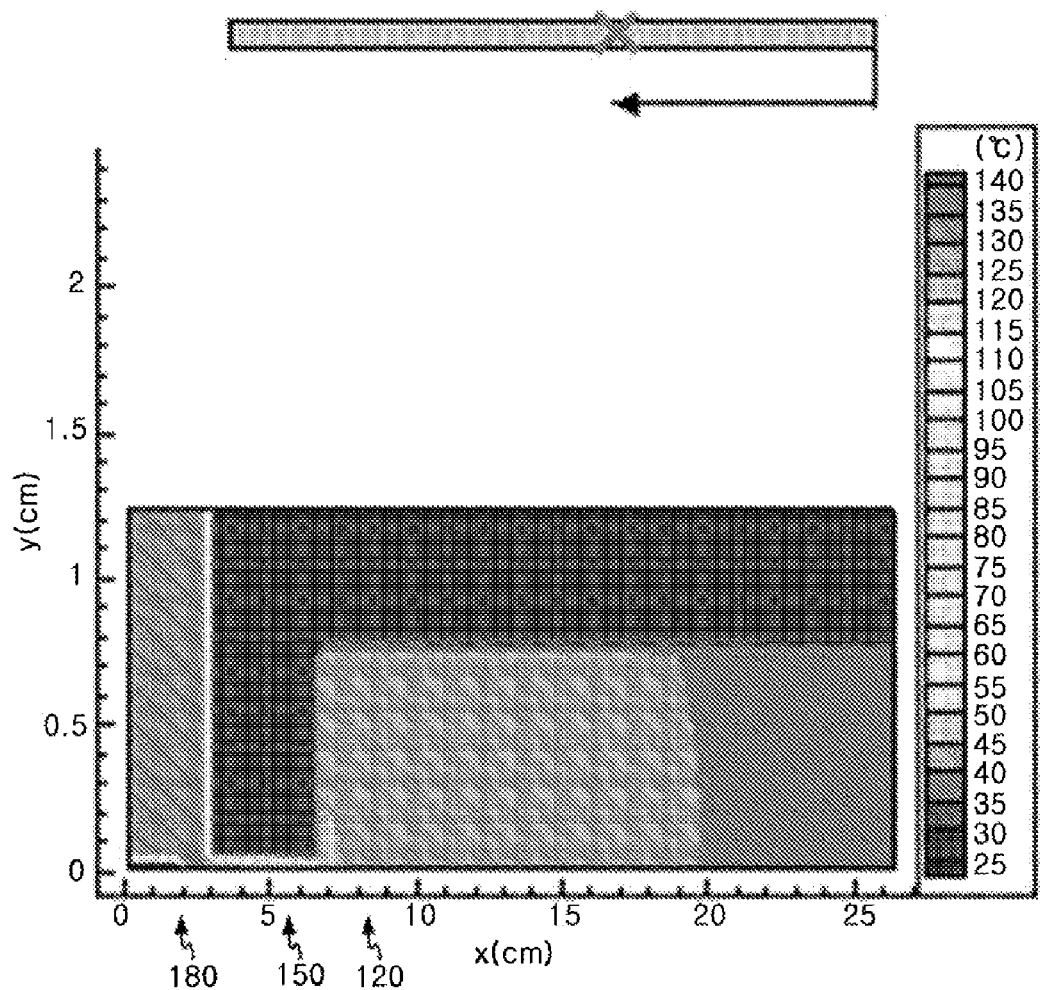
Figure 7C:
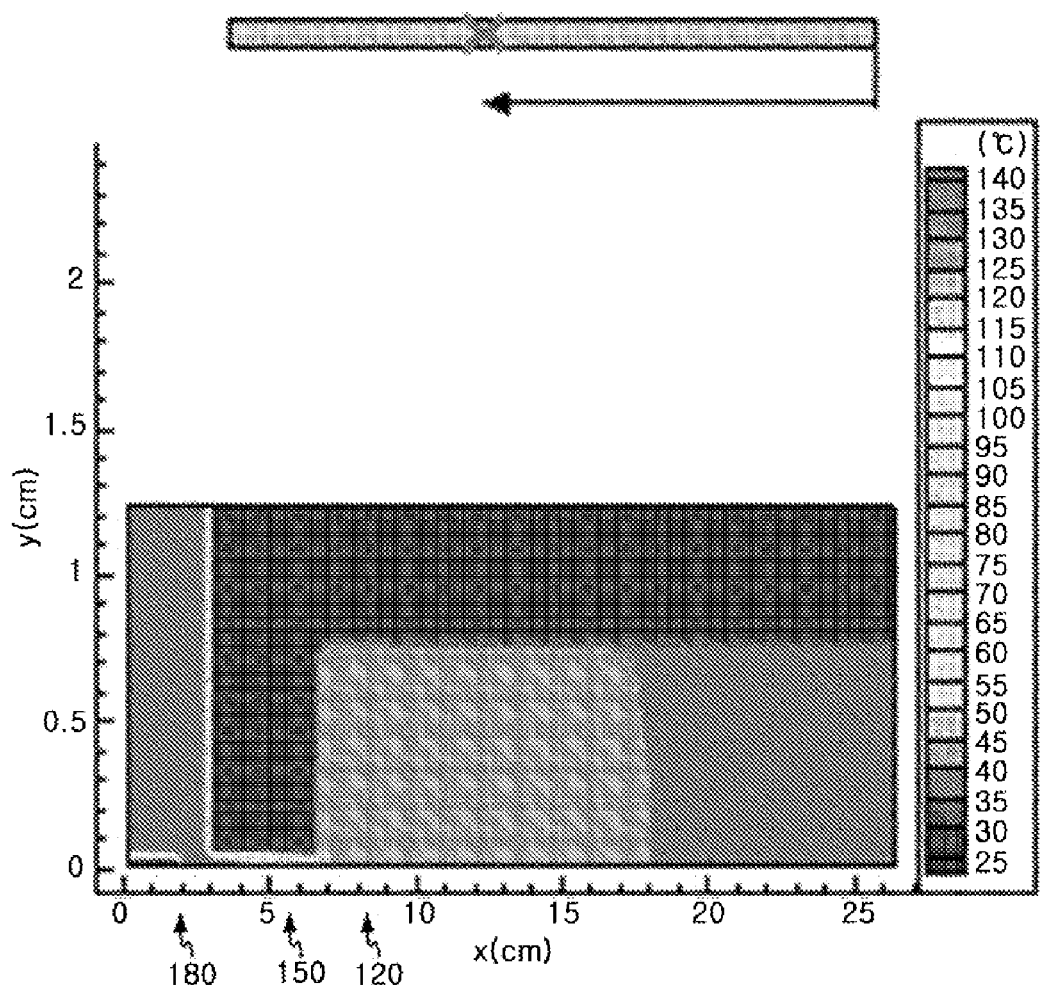

Subsequently, referring to FIGS. 7a through 7c, in FIG. 7a, the jig 180 is tinged with yellow, and the temperature of the jig 180 is about 120° C. Also, in FIG. 7b, the jig 180 is tinged with orange, and the temperature of the jig 180 is about 130° C. Also, in FIG. 7c, the jig 180 is tinged with red, and accordingly, the temperature of the jig 180 is about 140° C. On the contrary, in FIGS. 7a through 7c, the cell assembly 120 does not show a significant temperature difference though the temperature difference is more or less based on the location of the welding part. In the example of FIGS. 7a through 7c, the temperature of the cell assembly 120 is about 50° C.

That is, it can be seen that the location of the welding part significantly affects the temperature change of the jig 180, but does not significantly affect the temperature change of the cell assembly 120.

In another aspect, investigating a temperature change based on a charging capacity of the secondary battery, it can be seen that the jig 180 is significantly affected by an extent of change in charging capacity, but the cell assembly 120 is relatively less affected by an extent of change in charging capacity.

Referring to FIGS. 5a through 7c again, in the case of the jig 180, when the charging capacity increases by 15 Ah, the temperature increases by about 30° C. to about 50° C. In contrast, in the case of the cell assembly 120, even if the charging capacity increases by 15 Ah, the temperature increases only by about 10° C. to about 20° C.

Therefore, through the above experiment, the inventors found that it is preferred to form the welding part adjacent to the cell assembly 120 when forming the welding part to connect the electrode tab and the electrode lead.

According to another embodiment of the present disclosure, the welding part may be formed near the cell assembly 120 along the lengthwise direction of the electrode leads 150 and 160 with respect to a center point of the surface where the electrode tabs 130 and 140 are in contact with the electrode leads 150 and 160, respectively.

According to another embodiment of the present disclosure, the welding part may be formed within a ⅓ area closer to the cell assembly 120 among the lengthwise direction of the electrode leads 150 and 160 on the surface where the electrode tabs 130 and 140 are in contact with the electrode leads 150 and 160, respectively.

According to another embodiment of the present disclosure, the welding part may be formed within the range of 10 mm from one end of the electrode leads 150 and 160 disposed within the case 110.

Hereinafter, a method for manufacturing the above secondary battery is described. In the description of the method for manufacturing the secondary battery according to the present disclosure, a repeated description for each element is omitted herein.

Figure 8:
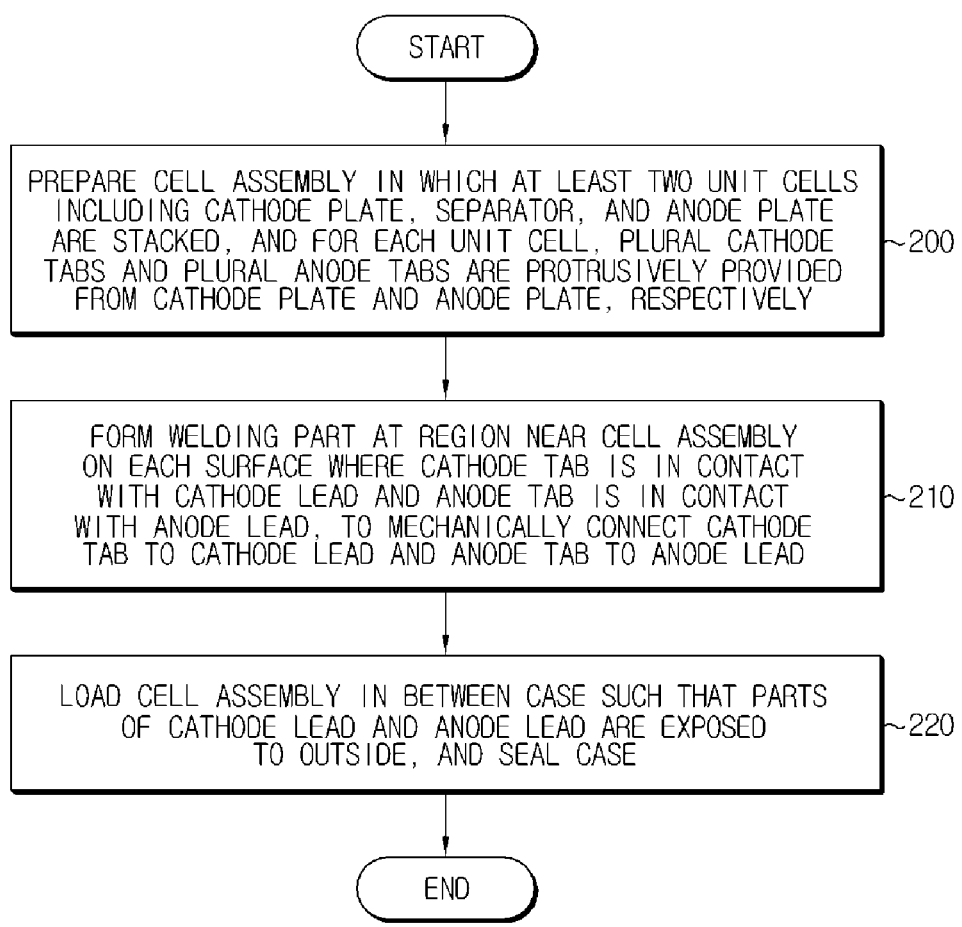
FIG. 8 is a flowchart illustrating a method for manufacturing a secondary battery according to an exemplary embodiment of the present disclosure.

FIG. 8 is a flowchart illustrating a method for manufacturing a secondary battery according to an exemplary embodiment of the present disclosure.

Referring to FIG. 8, in step 200, a cell assembly 120 is prepared in which at least two unit cells including a cathode plate, a separator, and an anode plate are stacked, and for each unit cell, a plurality of cathode tabs and a plurality of anode tabs are protrusively provided from the cathode plate and the anode plate, respectively.

In the next step 210, a welding part is formed at a region near the cell assembly 120 on each surface where the cathode tab 130 is in contact with the cathode lead 150 and the anode tab 140 is in contact with the anode lead 160, to mechanically connect the cathode tab 130 to the cathode lead 150 and the anode tab 140 to the anode lead 160.

According to one embodiment of the present disclosure, the welding part is formed near the cell assembly 120 along the lengthwise direction of the electrode leads 150 and 160 with respect to a center point of the surface where the electrode tabs 130 and 140 are in contact with the electrode leads 150 and 160, respectively.

According to another embodiment of the present disclosure, the welding part may be formed within a ⅓ area closer to the cell assembly 120 among the lengthwise direction of the electrode leads 150 and 160 on the surface where the electrode tabs 130 and 140 are in contact with the electrode leads 150 and 160, respectively.

According to another embodiment of the present disclosure, the welding part may be formed within the range of 10 mm from one end of the electrode leads 150 and 160 disposed within the case 110.

The welding part may be formed by resistance welding, ultrasonic welding, laser welding, or a conductive adhesive. In this instance, the welding part may be variously formed in the shape of a point or a line, or in geometry. Also, a plurality of welding parts may be formed.

In the next step 220, the cell assembly 120 is loaded in between the case 110 such that parts of the cathode lead 150 and the anode lead 160 are exposed to the outside, and the case 110 is sealed.

According to the present disclosure, the influence of heat generated from the welding spot between the electrode tab and the electrode lead on the performance of the secondary battery may be minimized. Accordingly, in the design of a large capacity secondary battery, the battery performance may be close to an ideal condition.

Hereinabove, the present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A secondary battery comprising:
   a cell assembly having a stack of at least two unit cells, each unit cell including a cathode plate, a separator, and an anode plate;
   a plurality of electrode tabs including a cathode tab protruding from the cathode plate and an anode tab protruding from the anode plate for each unit cell;
   a plurality of electrode leads including a cathode lead electrically connected to a plurality of cathode tabs and an anode lead electrically connected to a plurality of anode tabs;
   a welding part which mechanically connects a selected electrode tab to a selected electrode lead having a first end, and a second end spaced in a lengthwise direction from the first end; and
   a case which seals the cell assembly such that the first end of the selected electrode lead is exposed to an outside of the case, and the second end of the selected electrode lead is disposed within the case, the second end of the selected electrode lead being closer to the selected electrode tab than the first end of the selected electrode lead,
   wherein the welding part is formed closer to the second end of the selected electrode lead than the first end of the selected electrode lead on a surface where the selected electrode tab is each in contact with the selected electrode lead.

2. The secondary battery according to claim 1, wherein the welding part is formed within a ⅓ area closer to the cell assembly along a lengthwise direction of the selected electrode lead on a surface where the selected electrode tab is each in contact with the selected electrode lead.

3. The secondary battery according to claim 1, wherein the welding part is formed by resistance welding, ultrasonic welding, or laser welding.

4. The secondary battery according to claim 3, wherein the welding part is formed in a shape of a point or a line.

5. The secondary battery according to claim 3, wherein the welding part is formed in multiple numbers.

6. A method for manufacturing a secondary battery, comprising:
   (a) preparing a cell assembly in which at least two unit cells including a cathode plate, a separator, an anode plate, and a plurality of electrode tabs including a plurality of cathode tabs and a plurality of anode tabs;
   (b) providing a plurality of electrode leads including a cathode lead and an anode lead;
   (c) forming a welding part on a surface where a selected electrode tab is in contact with a selected electrode lead having a first end, and a second end spaced in a lengthwise direction from the first end, to mechanically connect the selected electrode tab to the selected electrode lead, the second end of the selected electrode lead being closer to the selected electrode tab than the first end of the selected electrode lead, and the welding part being formed closer to the second end of the selected electrode lead than the first end of the selected electrode lead; and
   (d) loading the cell assembly in a case such of the first end of the selected electrode lead is exposed outside the case, and the second end of the selected electrode lead is disposed within the case.

7. The method for manufacturing a secondary battery according to claim 6, wherein the step (c) comprises forming the welding part within a ⅓ area closer to the cell assembly along a lengthwise direction of the selected electrode lead on the surface where the selected electrode tab is each in contact with the selected electrode lead.

8. The method for manufacturing a secondary battery according to claim 6, wherein the step (c) comprises forming the welding part by resistance welding, ultrasonic welding, or laser welding.

9. The method for manufacturing a secondary battery according to claim 8, wherein the step (c) comprises forming the welding part in a shape of a point or a line.

10. The method for manufacturing a secondary battery according to claim 8, wherein the step (c) comprises forming a plurality of welding parts.

* * * * *